US005082724A

United States Patent [19]

Katsura et al.

[11] Patent Number: 5,082,724

[45] Date of Patent: Jan. 21, 1992

[54] PHOTOGRAHIC PAPER SUPPORT

[75] Inventors: Toru Katsura; Hiroo Kaji, both of Tokyo, Japan

[73] Assignee: Mitsubishi Paper Mills Limited, Tokyo, Japan

[21] Appl. No.: 475,907

[22] Filed: Feb. 6, 1990

[30] Foreign Application Priority Data

Feb. 6, 1989 [JP] Japan .................................. 1-028079

[51] Int. Cl.[5] .......................... B32B 23/08; S21H 1/34

[52] U.S. Cl. .................................... 428/303; 428/342; 428/512; 428/513; 428/516; 162/381

[58] Field of Search ............... 428/512, 342, 513, 303; 162/511, 516

[56] References Cited

U.S. PATENT DOCUMENTS 3,124,504 3/1964 Mahoney et al. .
3,239,371 3/1966 Whitney et al. .................... 428/513
3,647,619 3/1972 Mack et al. .

FOREIGN PATENT DOCUMENTS 317694 5/1989 European Pat. Off. .
3216840 12/1982 Fed. Rep. of Germany ...... 428/513
3543597 6/1987 Fed. Rep. of Germany ...... 428/513
58-37642 8/1983 Japan .
1260240 11/1986 Japan .................................. 428/513
63-291054 11/1988 Japan .
2003952 3/1979 United Kingdom .

*Primary Examiner*—P. C. Sluby
*Attorney, Agent, or Firm*—Cushman, Darby and Cushman

[57] ABSTRACT

A photographic support consisting essentially of base paper and a polyolefin resin with which both sides of the base paper are coated, the base paper having a standard deviation of the weight variation caused by a wire mark formed on the base paper of 1.0 $g/m^2$ or less and a standard deviation of the weight variation caused by the dispersibility of pulp fiber composing the base paper of 8.0 $g/m^2$ or less. The photographic support has an excellent smoothness.

5 Claims, No Drawings

PHOTOGRAHIC PAPER SUPPORT

This invention relates to a photographic support having an excellent surface smoothness.

A photographic support is required to have a good smoothness in view of the appearance and the resolution of an image to be formed thereon. The smoothness required of a photographic support must be far better than the smoothness required of cultural papers such as coated paper and the like. In order to achieve rapid photographic development, polyolefin reins are generally used to coat both sides of a base paper to prevent the treatment solution from penetrating into the paper.

In the case of such a photographic support, unlike in the case of conventional baryta paper, the photographic paper obtained by coating a photographic support with a photosensitive emulsion is not subjected to a ferrotype treatment after development. The smoothness of the photographic paper which has been subjected to development and drying is substantially determined by the smoothness of the photographic support.

In order to coat base paper with a resin such as a polyolefin resin, the molten resin at a high temperature is applied in the form of a film having a uniform thickness to the base paper by an extrusion coating machine or the like. Thus, the smoothness of the base paper has a great influence on the smoothness of the photographic support. Therefore, it has been required that base paper having better smoothness than that of conventional base paper be coated with a resin such as a polyolefin resin or the like.

As to smoothness of paper, Japanese Patent Application Kokai No. 58-37642 discloses a smoothness determined by a Bekk smoothness tester and Japanese Patent Application Kokai No. 63-291054 discloses an average center plane-roughness determined by a three dimensional surface roughness tester.

As methods of improving the smoothness of a paper, the following methods have been known: (1) The fiber length of the pulp used for paper is adjusted so that the distribution thereof falls within a specific range as disclosed in, for example, Japanese Patent Application Kokai Nos. 58-68037 and 62-54252. (2) The light scattering coefficient of the pulp used for paper is controlled as disclosed in Japanese Patent Application Kokoku No. 59-42295. (3) Pulp having a small fineness and a short fiber length is used for the paper. (4) The formation of paper is improved. (5) Paper is subjected to a calendering treatment. Especially, Japanese Patent Application Kokai No. 63-291054 discloses a method in which the formation of paper is improved so that the variation of the amount of laser beam transmitted through the paper is adjusted to a certain value. However, paper having a sufficient smoothness can not be obtained by these methods, and hence, a photographic support having a sufficient smoothness can not be obtained.

It is an object of this invention to provide a photographic support consisting essentially of base paper and a polyolefin resin with which both sides of the base paper are coated, said photographic support having an excellent smoothness.

According to this invention, there is provided a photographic support consisting essentially of base paper and a polyolefin resin with which both sides of the base paper are coated, the base paper having a standard deviation of the weight variation caused by a wire mark formed on the base paper of 1.0 $g/m^2$ or less and a standard deviation of the weight variation caused by the dispersibility of pulp fibers composing the base paper of 8.0 $g/m^2$ or less.

The physical property and characteristics of the base paper supporting the polyolefin resin are important factors in determining the overall smoothness of the photographic support. Uneven shrinkage of the surface of the base paper can occur when the paper is contacted with the high temperature molten resin in the extrusion coating step. In order to prevent uneven shrinkage, the base paper should have improved uniformity. The term "uniformity" used herein does not mean the formation of the paper, namely, the optical uniformity of the paper represented by the variation of the amount of a laser beam or the like transmitted through the base paper, but means the uniformity of small-scale weight distribution in the base paper. In general, the variation of the amount of the transmitted light has been used as an indication of the weight variation. However, as described by A. Komppa in Paperi. Ja. Puu, 3, 243 (1988), it is known that the variation of the amount of the transmitted light is not suitable as an indication of the weight variation when the pulp composing the paper has been highly beaten or the paper has been subjected to a strong calendering treatment. Since base paper for a photographic support is generally subjected to a strong calendering treatment, the variation of the amount of the transmitted light is not suitable as an indication of the weight variation.

The present inventors have tried to improve the uniformity of the base paper using an image indicating the weight variation of base paper, which image is obtained by a beta-ray or soft X-ray photograph. As a result, it has been found that a photographic support having an excellent smoothness can be obtained by using base paper having a standard deviation of the weight variation caused by a wire mark formed on the base paper of 1.0 $g/m^2$ or less and a standard deviation of the weight variation caused by the dispersibility of the pulp fibers composing the base paper of 8.0 $g/m^2$ or less.

In this invention, an image indicating the weight variation of base paper can be obtained by a beta-ray photograph of the base paper as described by B. Norman and D. Wahren in Svensk Paperstinding, vol. 75, 29, 807 (1972) or a soft X-ray photograph of the base paper as described by T. E. Farrington, Jr. in Tappi Journal, May 1988, page 140. Since the beta-ray and soft X-ray have a short wave length and an excellent rectilinear propagation property as compared with lights, the use of such a radiation makes it possible to obtain an image having optical densities the difference of which properly corresponds to the weight variation and is not affected by the density variation of the base paper, the optical properties of the pulp or the like. Incidentally, the conversion of optical densities of the image to weights is made possible by taking a photograph of a standard sample of the known weight along with the base paper.

In this invention, the standard deviation of the weight variation caused by a wire mark or the dispersibility of pulp fibers can be measured as follows:

The image indicating the weight variation is subjected to two-dimensional Fourier transform using an image analyzer under the condition that a pixcel is 0.1 mm$\times$0.1 mm to obtain power spectra. And then the spectra of the periodic variation caused by a wire mark and the spectrum of the nonperiodic variation caused by the dispersibility of pulp fibers are isolated by a computer. Each spectrum isolated above is subjected to inverse Fourier transform to obtain an image indicating each variation. This method is described in detail by H. Paast and L. Goettsching in Das Papier, vol. 41, No. 3, 105 (1987).

Specific methods for producing the base paper used in this invention are as follows:

(1) Using pulp having a Canadian standard freeness of 150–300 ml and a weight average fiber length of 0.45–0.65 mm when the pulp is in the head box of a paper machine. (2) Using a plastic wire having a double and a half layered structure or a triple layered structure as a wire used in making paper. These wires are disclosed in Japanese Journal of Paper Technology, May 1988, page 15. (3) Making paper by a hybrid former. The hybrid former includes a Bel-Bond former, a Synformer R, a Duoformer H and a Fourdrinier machine having an upper dewatering mechanism as disclosed in Journal of the Japanese Technical Association of the Pulp and Paper Industry, July 1988, page 23. These methods may be used alone or in combination.

If necessary, the base paper may contain an additive generally used in making paper such as an anti-foggant, a filler, a dye, a sizing agent, a dry-strength-reinforcing agent, a wet-strength-reinforcing agent, a fixing agent, a retention aid or the like. Moreover, if necessary, the base paper may be subjected to a surface treatment with starch, poly(vinyl alcohol), gelatin or the like or an antistatic treatment with Glauber's salt, sodium chloride, aluminum chloride, an organic conductive agent or the like.

The polyolefin resin used in this invention includes a homopolymer consisting of an α-olefin such as ethylene, propylene or the like; a copolymer consisting of two or more α-olefins; a copolymer consisting of an α-olefin as a main component and another monomer copolymerizable with the α-olefin; and a mixture of these polymers. To the above polyolefin resin, there may be added a white pigment such as titanium dioxide, alumina, calcium carbonate or the like; a color pigment; a reagent generally added to a resin such as a stabilizer, an antioxidant, a dispersing agent, a lubricant or the like.

The photographic support of this invention is produced by a so-called extrusion coating method, in which molten polyolefin resin is casted on the running base paper.

Preferably, the base paper used for the photographic support of this invention has a basis weight of 80–200 $g/m^2$ and is subjected to a press treatment and/or a calendering treatment so that the base paper has a density of 0.9–1.2 $g/cm^3$ Each of the polyolefin resin layers on both sides of the base paper preferably has a thickness of 15–40 μm. The polyolefin resin layer on the right side (i.e. the side to be coated with an emulsion) preferably contains a white pigment in an amount of 5–25% by weight based on the weight of the polyolefin resin on the right side.

In the photographic support consisting essentially of base paper and polyolefin resin with which both sides of the base paper are coated, the problem due to relatively small-scale roughness having a period (i.e. the distance between two adjacent peaks on the surface of the base paper) of 1 mm or less affecting the photographic resolution and the problem due to relatively large-scale roughness affecting the appearance of the photographic paper can be simultaneously overcome by adjusting the standard deviation of the weight variation caused by a wire mark formed on the base paper to 1.0 $g/m^2$ or less (to overcome the former) and adjusting the standard deviation of the weight variation caused by the dispersibility of pulp fibers composing the base paper to 8.0 $g/m^2$ or less (to overcome the latter). The base paper used in this invention has a standard deviation of the weight variation caused by a wire mark of 1.0 $g/m^2$ or less and a standard deviation of the weight variation caused by the dispersibility of pulp fibers of 8.0 $g/m^2$ or less. Therefore, the photographic support of this invention has an excellent smoothness.

The following Examples further illustrates this invention. However, this invention is not restricted to these Examples. In the Examples, the terms "parts" and "%" represent "parts by weight" and "% by weight" respectively.

EXAMPLE 1

70 Parts of bleached hardwood kraft pulp which has been beaten in a double disk refiner so as to have a Canadian standard freeness of 250 ml and 30 parts of bleached softwood sulfite pulp which has been beaten in a double disk refiner so as to have a Canadian standard freeness of 280 ml were mixed together. To 100 parts of the resulting mixture, 2 parts of cationized starch, 0.3 part of a higher fatty acid amide, 0.3 part of alkylketene dimer and 0.3 part of polyamide-epichlorohydrin resin were added, and then mixed to obtain a paper slurry. From the resulting paper slurry, paper having a basis weight of 160 $g/m^2$ and a density of 1.05 $g/cm^3$ was made by a hybrid former (Bel-Bond Former) having a double layered plastic wire (LL400, manufactured by Nippon Filcon Co.). Incidentally, the pulp fibers in the head box had a weight average fiber length of 0.6 mm.

Both sides of the paper obtained above were subjected to a corona discharge treatment. The right side and the back side of the paper were coated with low-density polyethylene containing 10% titanium dioxide and low-density polyethylene alone respectively at the resin temperature of 330° C. by an extrusion coating machine to obtain a photographic support. Each resin with which both sides of the paper were coated had a thickness of 30 μm. And then the right side of the photographic support obtained above was coated with a general photographic emulsion composed of gelatin and silver halide to obtain photographic paper. The photographic paper was exposed to a light and developed, and then the smoothness thereof was evaluated by the eye and classified as follows:

A : Very good
B : Good
C : Not good
D : Bad

Among these four ranks, A and B satisfy the quality required recently. Incidentally, most of photographic paper now on the market has a smoothness of C or D.

EXAMPLE 2

The same procedure as in Example 1 was repeated except that a Fourdrinier machine having double and a half layered plastic wire (LL70E, manufactured by Nippon Filcon Co.) as the paper machine.

EXAMPLE 3

The same procedure as in Example 1 was repeated except that there was used, as the pulp composing the base paper, bleached hardwood sulfite pulp which has been beaten so as to have a Canadian standard freeness of 120 ml. Incidentally, the pulp fibers in the head box had a weight average fiber length of 0.40 mm.

COMPARATIVE EXAMPLE 1

The same procedure as in Example 2 was repeated except that a double layered plastic wire (LL400, manufactured by Nippon Filcon Co.) was used as the wire.

COMPARATIVE EXAMPLE 2

The same procedure as in Example 1 was repeated except that there was used, as the pulp composing the base paper, bleached softwood sulfite pulp which has been beaten so as to have a Canadian standard freeness of 350 ml. Incidentally, the pulp contained in the paper slurry in the head box had a weight average fiber length of 0.8 mm.

COMPARATIVE EXAMPLES 3 and 4

Two kinds of commercially available photographic papers were used as sample.

From these photographic supports were removed resin layers to obtain base paper. And then soft X-ray photograph of the base paper was taken using a soft X-ray generator (CMR, manufactured by Softex). The image formed on the photograph was subjected to image analysis under a condition that a pixel is 0.1 mm×0.1 mm by an image analyzer (Luzex 5000X, manufactured by NIRECO, Japan). And then the standard deviation of the weight variation caused by the wire mark and the standard deviation of the weight variation caused by the dispersibility were calculated. Incidentally, the fluctuation of the amount of the transmitted laser beam was also measured as to these base paper. However, there was found no relationship between the variation of the amount of the transmitted laser beam and the weight variation obtained by using soft X-ray photograph described above.

Results are shown in Table 1.

TABLE 1

| | Standard deviation of the weight variation | | |
|---|---|---|---|
| | Caused by a wire mark, $g/m^2$ | Caused by the dispersibility, $g/m^2$ | Smoothness |
| Example 1 | 0.5 | 8.0 | A |
| Example 2 | 1.0 | 7.5 | B |
| Example 3 | 0.7 | 6.0 | A |
| Comparative Example 1 | 1.5 | 7.3 | C |
| Comparative Example 2 | 0.7 | 12.0 | D |
| Comparative Example 3 | 1.8 | 8.0 | D |
| Comparative Example 4 | 1.0 | 10.0 | C |

As is clear from Table 1, a photographic support having an excellent smoothness can be obtained by using base paper having a standard deviation of the weight variation caused by a wire mark of 1.0 $g/m^2$ or less and a standard deviation of the weight variation caused by the dispersibility of the pulp fibers of 8.0 $g/m^2$ or less.

What is claimed is:

1. A photographic support consisting essentially of base paper and a polyolefin resin with which both sides of the base paper are coated, the base paper having a standard deviation of the weight variation caused by a wire mark formed on the base paper of 1.0 $g/m^2$ or less and a standard deviation of the weight variation caused by the dispersibility of pulp fibers composing the base paper of 8.0 $g/m^2$ or less.

2. A photographic support according to claim 1, wherein the base paper is composed of pulp having a Canadian Standard Freeness of 150-300 ml and a weight average fiber length of 0.45-.65 mm.

3. A photographic support according to claim 1, wherein the base paper is made by a paper machine comprising a plastic wire having a double and a half layered structure or a triple layered structure.

4. A photographic support according to claim 1, wherein the base paper is made by a hybrid former.

5. A photographic support according to claim 1, wherein the base paper has a basis weight of 80-200 $g/m^2$ and a density of 0.9-1.2 $g/cm^2$.

* * * * *